Figure 1:
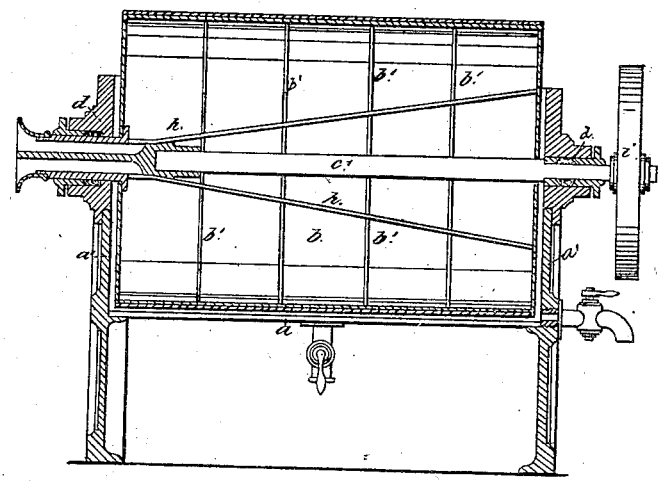

H. BESSIMER.
FILTERING DRUM.

No. 9,608. Patented Mar. 8, 1853.

UNITED STATES PATENT OFFICE.

HENRY BESSEMER, OF BAXTER HOUSE, ENGLAND.

FILTER FOR CANE-JUICE.

Specification of Letters Patent No. 9,608, dated March 8, 1853.

*To all whom it may concern:*

Be it known that I, HENRY BESSEMER, of Baxter House, Old Saint Pancrass Road, in the county of Middlesex, England, have invented a new and useful or Improved Machine, Filtering-Drum, or Apparatus for the Filtration of Sugar-Cane Juice or other Liquids; and I do hereby declare that the same is fully described and represented in the following specification, reference being had to the accompanying drawings, making part of the same.

When cane juice is drawn off from the "clarifiers" it is generally mixed with a small quantity of feculent matter, which should be separated therefrom before the juice is concentrated. I prefer in all cases that the cane juice should be boiled for three or five minutes in the clarifier, in order that the whole of the albuminous matters which it contains should be coagulated and their entire removal effected by filtration before the process of concentration is commenced. When this however is not done, and the cane juice is clarified in the usual way, without boiling it, I prefer to evaporate the juice until it arrives at a density of 25 degrees Baumé, when filtration should take place, and afterward the final concentration of the syrup be proceeded with.

My apparatus abovementioned is shown in the drawings, of which—

Figure 2:
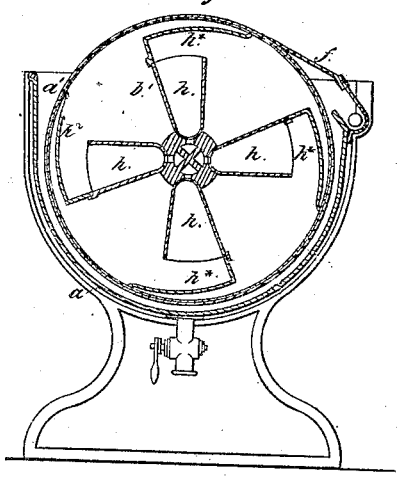
Figure 3:
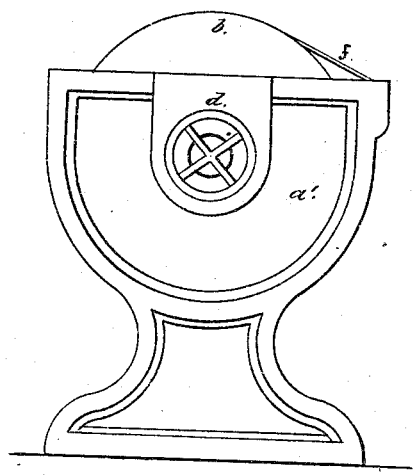

Figure 1, is a longitudinal vertical section of it. Fig. 2 a vertical cross section of it, and Fig. 3 is an end elevation of the same.

$a$ in said figures is a vessel, formed with a semi-cylindrical bottom, and with flat ends $a'$. In this vessel there is a "drum" $b$ formed in part of circular disks of metal $b'$, which are mounted on a shaft $c'$.

The disks are for the purpose of sustaining a covering of perforated metal, which forms the cylindrical part or shell of the drum. Each end of the drum is closed, and the axle of it passes through stuffing boxes $d$ formed in the ends of the vessel $a$. One end of this axis is made hollow, for the purpose of allowing the filtered juice to flow through it. The cylindrical part of the drum $b$ is covered with a close woven cotton cloth, or other fabric, which may be woven cylindrical and without a seam, and made to fit very tightly to the drum. On one side of the vessel $a$ there is placed a scraper $f$ formed of a thin blade of metal, which is made to press lightly against the drum. On the inside of the drum there are four gutters $h$, which are placed in inclined positions, so that the lower end of each of them may be in communication with one of the four passages leading through the axis of the drum. The action of the apparatus is as follows, motion is communicated to the drum by means of the pulley $i$ so as to cause it to move at the rate of one or two revolutions per minute. The cane juice is allowed to flow into the vessel $a$, where it will commence to flow or percolate through the woven fabric or covering and into the interior of the drum, leaving the solid impurities on the exterior surface of it.

It will be observed that the gutters $h$ are elongated on one side. This elongated part is bent nearly at right angles as seen at $h^*$, somewhat like the bucket of a water wheel, so that as the drum revolves, the filtered cane juice within it is lifted up, and caused to flow along the gutter and through the hollow axle. This takes place with each gutter in succession and thus prevents any undue accumulation in the interior of the drum, the rotation of which causes the coating of solid matter upon its surface to come into contact with the scraper $f$, which will remove such matter from the said surface of the drum and cause this surface, when it again descends into the juice, to be so cleansed as to allow the process of filtration to be repeated through it, and thus the operation may be continued for an indefinite period without interruption. In consequence of the filtering surface being thus alternately coated with solid matters and cleansed, the impure matters or scum that are thus separated fall from the scraper $f$ into a suitable vessel or receptacle, which may be arranged under it and emptied as often as may be required.

Having thus described my invention, what I claim is—

The combination of the receiving vessel $a$, the rotating filtering drum (placed within the said vessel) the gutters $h$ (within the drum), the hollow axle or shaft (connected with said gutters) and the scraper applied to the outer surface of the revolving drum; the whole being arranged and made to operate together, substantially in manner and for the purpose as hereinbefore specified.

In testimony whereof I have hereto set my signature this thirtieth day of December A. D. 1852.

HENRY BESSEMER.

Witnesses:
JOSEPH MARQUETTE,
JOHN R. DARKER.